Sept. 11, 1956

E. G. ARELT 2,762,329

APPARATUS FOR DECORATING POTTERY WARE

Filed Oct. 31, 1951

EUGENE·G·ARELT
INVENTOR.

BY Bodell + Thompson
Attorneys.

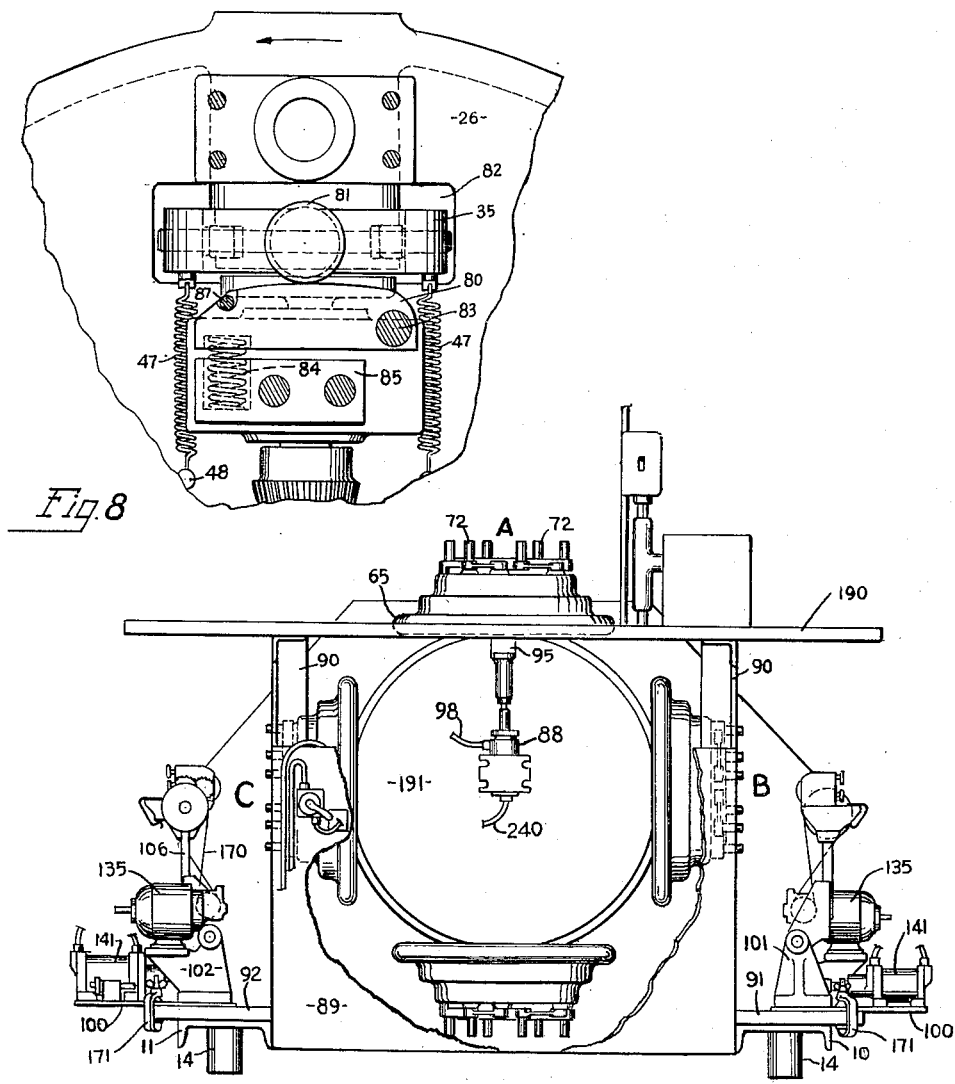

Sept. 11, 1956  E. G. ARELT  2,762,329
APPARATUS FOR DECORATING POTTERY WARE
Filed Oct. 31, 1951  10 Sheets-Sheet 3

EUGENE·G·ARELT
INVENTOR.
BY Bodell+Thompson
Attorneys.

EUGENE·G·ARELT
INVENTOR.

BY Bodell + Thompson
Attorneys.

Sept. 11, 1956 E. G. ARELT 2,762,329
APPARATUS FOR DECORATING POTTERY WARE
Filed Oct. 31, 1951 10 Sheets-Sheet 5

EUGENE·G·ARELT
INVENTOR.

BY Bodell + Thompson
Attorneys.

Sept. 11, 1956      E. G. ARELT      2,762,329
APPARATUS FOR DECORATING POTTERY WARE
Filed Oct. 31, 1951      10 Sheets-Sheet 6

EUGENE·G·ARELT
*INVENTOR.*

BY *Bodell + Thompson*
*Attorneys*

Sept. 11, 1956   E. G. ARELT   2,762,329
APPARATUS FOR DECORATING POTTERY WARE
Filed Oct. 31, 1951   10 Sheets-Sheet 7
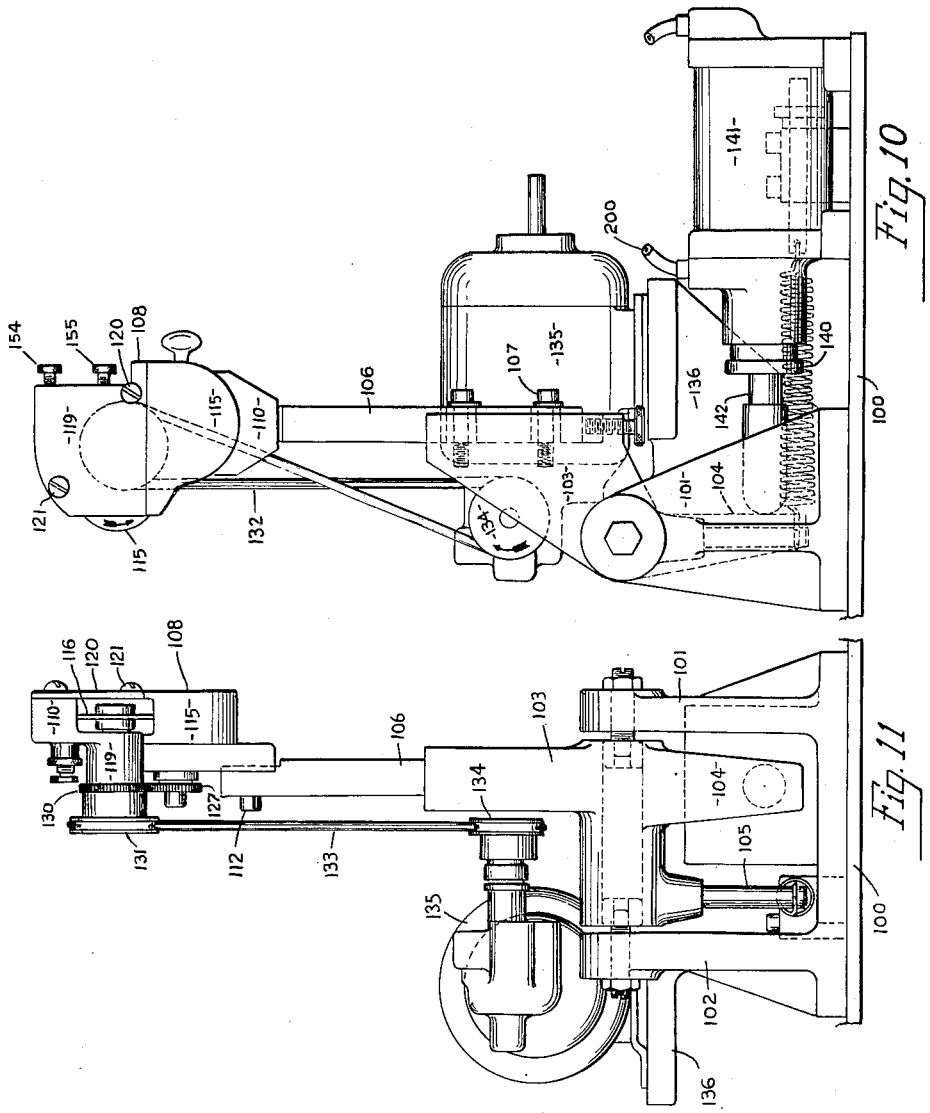
EUGENE G. ARELT
INVENTOR.
BY Bodell & Thompson
Attorneys.

Sept. 11, 1956　　　　E. G. ARELT　　　　2,762,329
APPARATUS FOR DECORATING POTTERY WARE
Filed Oct. 31, 1951　　　　　　　　　　　10 Sheets-Sheet 8

EUGENE·G·ARELT
INVENTOR.

BY Bodell + Thompson
Attorneys.

EUGENE·G·ARELT
INVENTOR.

Sept. 11, 1956  E. G. ARELT  2,762,329
APPARATUS FOR DECORATING POTTERY WARE
Filed Oct. 31, 1951  10 Sheets-Sheet 10
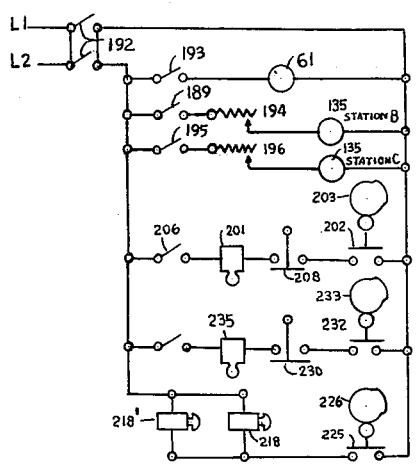
Fig.26
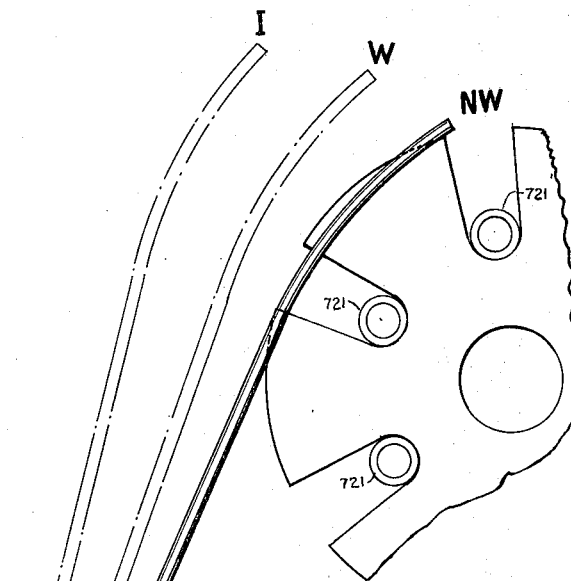
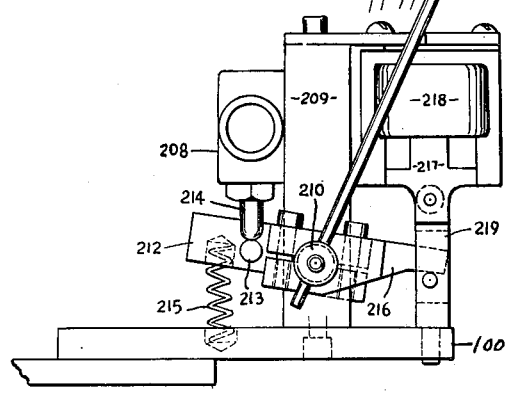
Fig.23
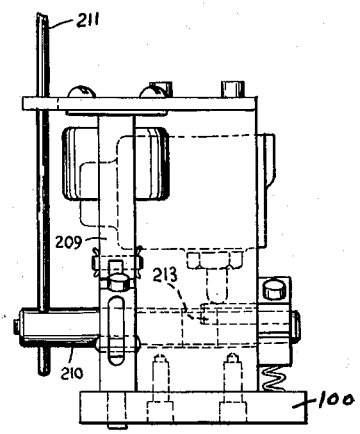
Fig.24
EUGENE G ARELT
INVENTOR.
BY Bodell + Thompson
Attorneys.

United States Patent Office 2,762,329
Patented Sept. 11, 1956

2,762,329
APPARATUS FOR DECORATING POTTERY WARE

Eugene G. Arelt, Baldwinsville, N. Y., assignor to Onondaga Pottery Company, Syracuse, N. Y., a corporation of New York Application October 31, 1951, Serial No. 254,090

11 Claims. (Cl. 118—2)

This invention relates to apparatus for decorating or ornamenting disklike articles of dinnerware, such as plates and saucers. The ornamentation consists in the application of circular bands of colored material.

The invention has as an object an apparatus of the type referred to embodying a structure by which the apparatus is particularly convenient to operate, particularly as to the insertion of undecorated ware, and the removal of decorated ware.

The invention has as a further object decorating apparatus embodying a series of ware centering and gripping chucks which function to automatically center and grip the piece of ware and to effect rotation thereof during the application of the decorative band.

The invention has as a further object a color applicator unit embodying a structural arrangement which functions to apply a band of uniform width and free from defects to each piece of ware.

The invention consists in the novel features and in the combinations and constructions hereinafter set forth and claimed.

In describing this invention, reference is had to the accompanying drawings in which like characters designate corresponding parts in all the views.

Figure 2 is a front elevational view of the apparatus with the front wall of the enclosing cabinet partially broken away.

Figure 1:
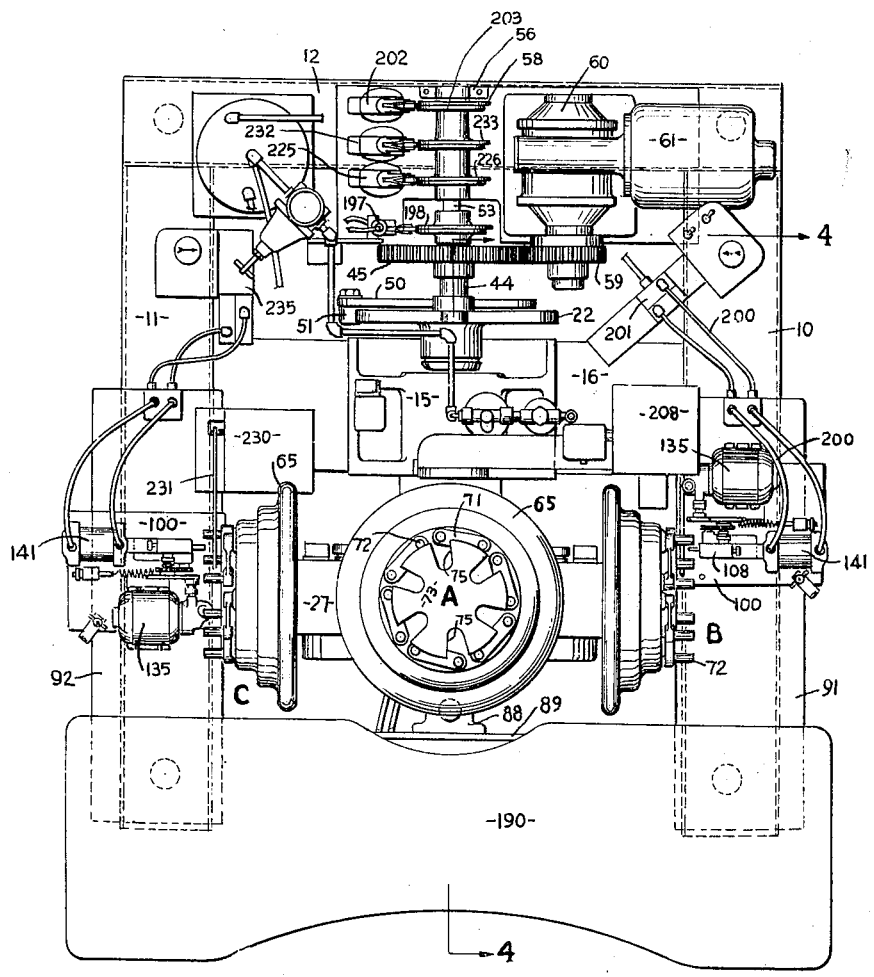
Figure 1 is a top plan view of an apparatus embodying my invention.
Figure 4:
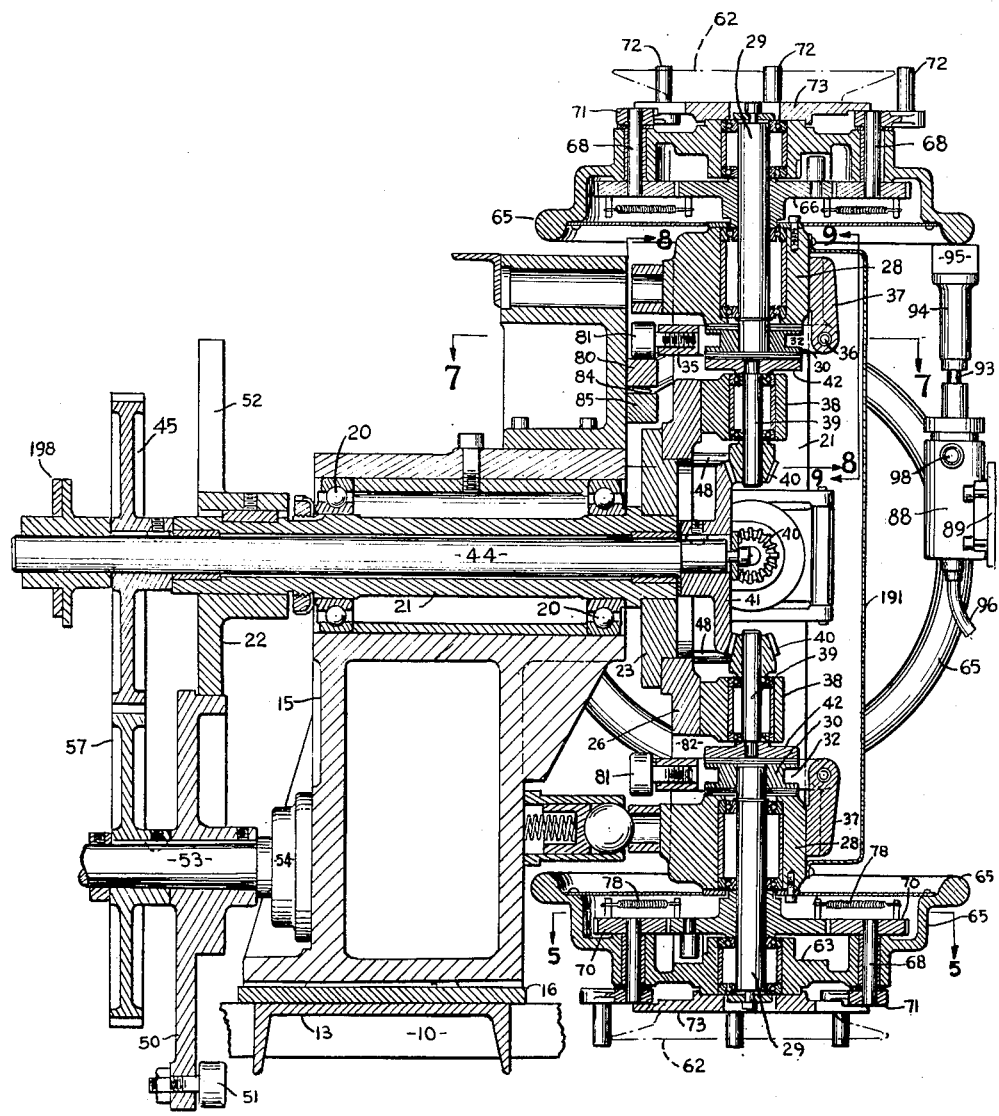
Figure 5:
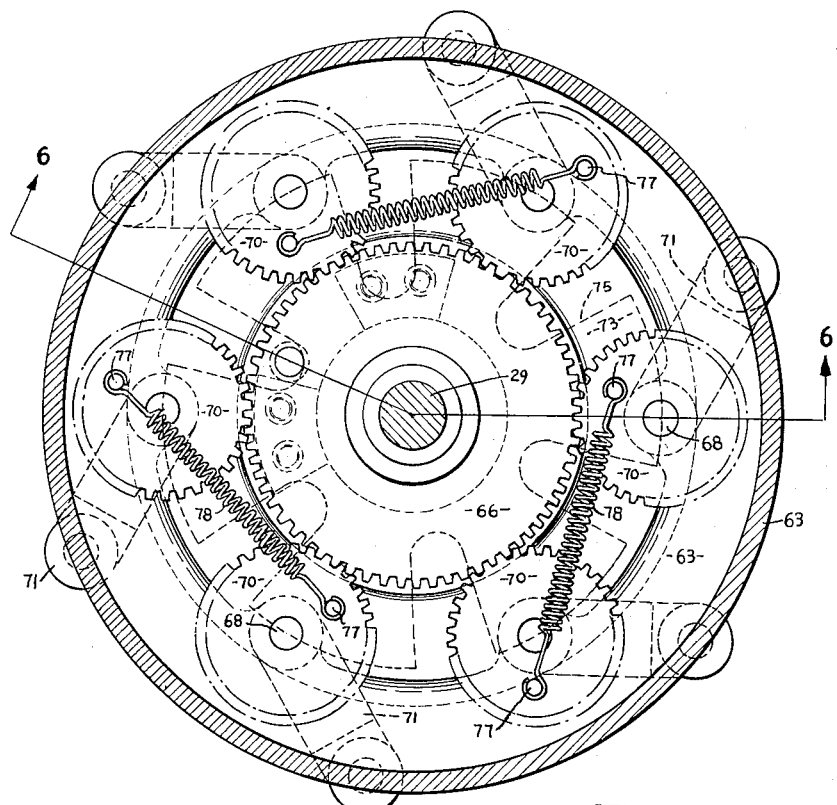
Figure 6:
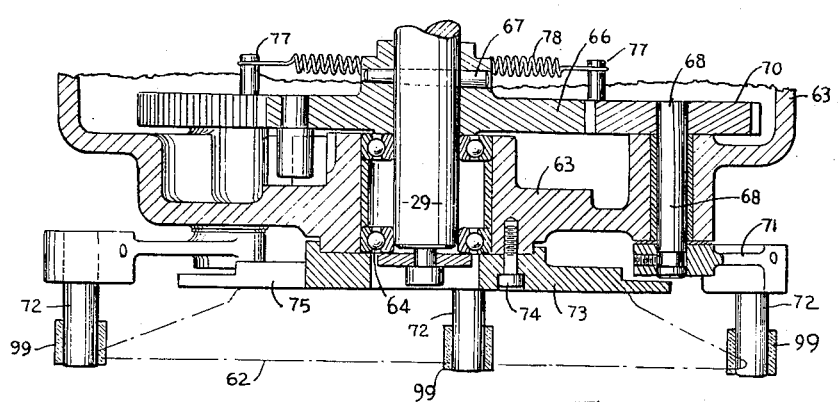
Figure 7:
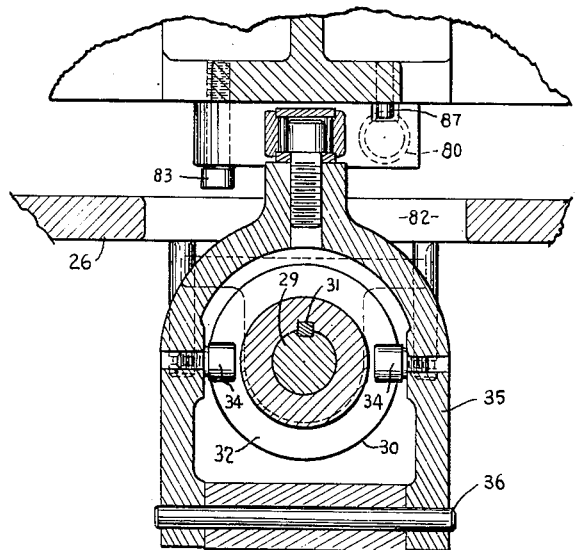
Figure 9:
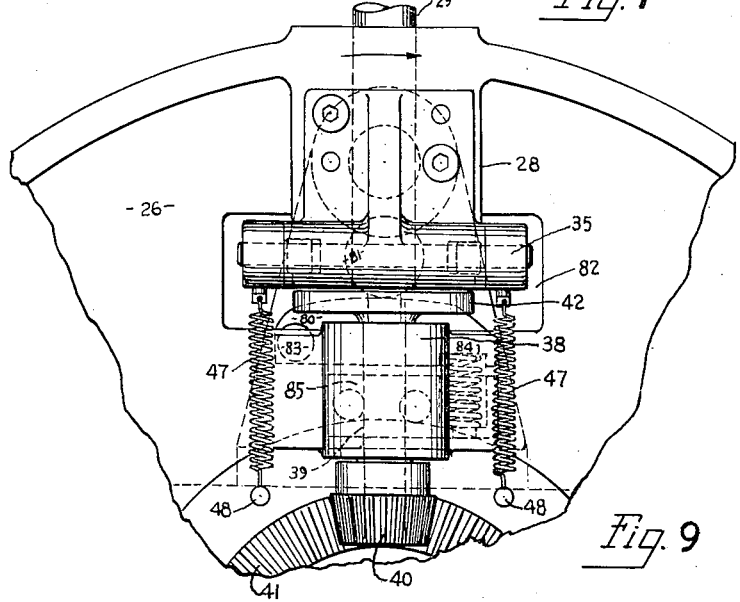

Figure 4 is a view taken on line 4—4, Figure 1.
Figure 5 is a view taken on line 5—5, Figure 4.
Figure 6 is a view taken on line 6—6, Figure 5.
Figure 7 is a view taken on line 7—7, Figure 4.
Figure 8 is a view taken on line 8—8, Figure 4.
Figure 9 is a view taken on line 9—9, Figure 4.

Figure 10 is an enlarged elevational view of the color applicator unit as shown in the lower right portion of Figure 2.

Figure 11 is a view looking to the right of Figure 10.

Figures 12, 13:
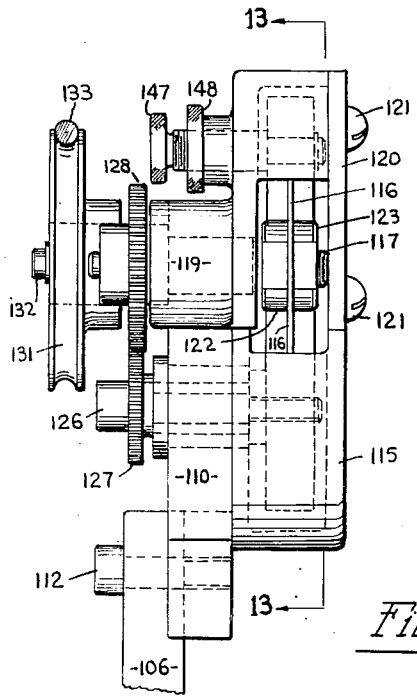

Figure 12 is an enlarged elevational view of the color applicator head looking to the right of the upper portion of Figure 10.

Figure 15:
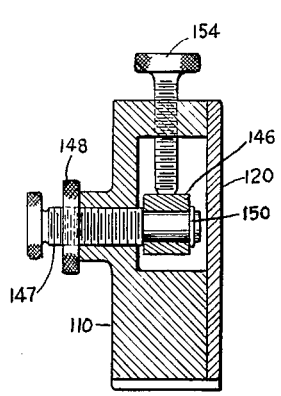
Figure 14:
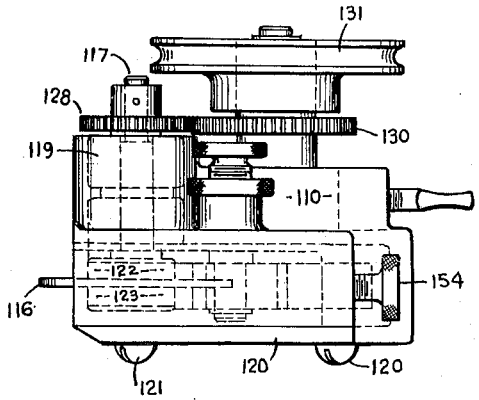
Figure 17:
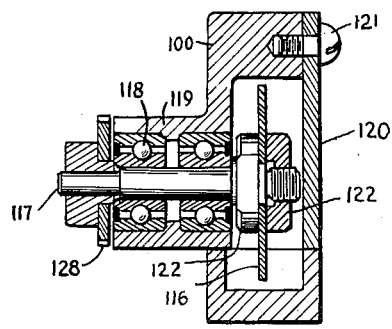
Figure 16:
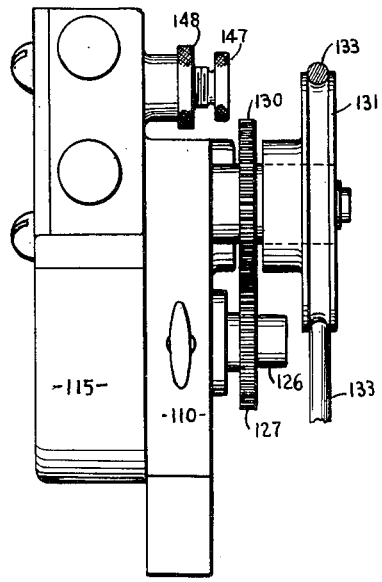
Figure 18:
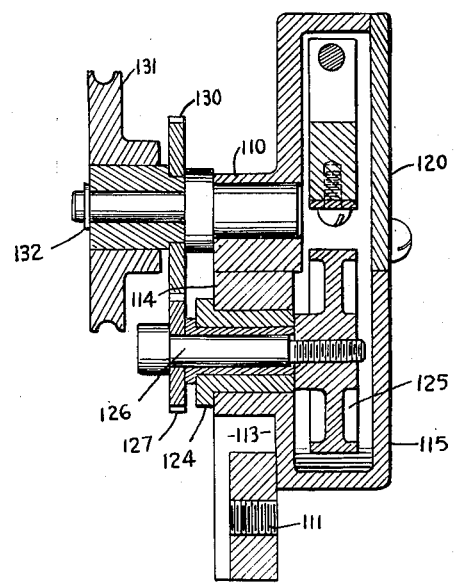

Figure 13 is a view taken on line 13—13, Figure 12.
Figure 14 is a top plan view of the applicator head structure shown in Figure 12.
Figure 15 is a view taken on line 15—15, Figure 13.
Figure 16 is a view similar to Figure 12 but looking to the left in Figure 10.
Figure 17 is a view taken on line 17—17, Figure 13.
Figure 18 is a view taken on line 18—18, Figure 13.

Figure 19:
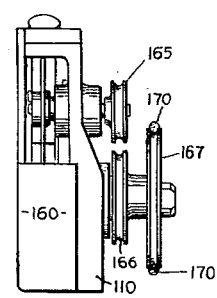

Figure 19 is a front elevational view of the head of the applicator unit shown at the left in Figure 2.

Figure 20:
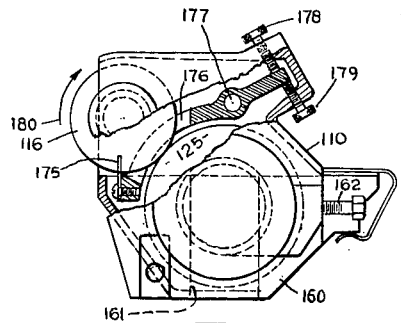

Figure 20 is a view looking to the right, Figure 19, with parts broken away and parts in section.

Figure 21:
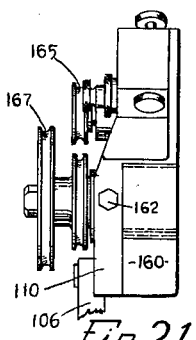

Figure 21 is a rear elevational view of the structure shown in Figure 19.

Figure 22 is a top plan view of the structures shown in Figures 19, 20 and 21, with parts broken away and parts in section.

Figure 23 is a side elevational view of one of the ware detecting mechanisms.

Figure 24 is a view looking to the right, Figure 23.

Figure 25:
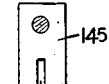

Figure 25 is a plan view of the doctor blade for removing surplus material from the applicator wheel.

Figure 26 is a schematic wiring diagram of the electrical system.

The frame of the machine includes a pair of side rails 10, 11, and cross members 12, 13. These members are supported on legs 14. The frame further includes a box shaped casting 15 secured to a plate 16 positioned on the cross member 13. The upper portion of the casting 15 is formed with a horizontally extending bore to receive antifriction bearings 20 in which there is journalled a quill shaft 21, this shaft extending rearwardly and having fixedly keyed thereon a Geneva disk 22. The forward end of the shaft has fixedly secured thereto a disk 23. A circular member 26 is fixed to the disk 23 and is formed with an annular flange 27 and bosses 28 extending inwardly from the flange 27 and formed with bores extending radially from the axis of the shaft 21. There is journalled in the bore of each boss 28 a shaft 29. A collar 30 is slidably mounted on the inner end of each of the shafts 29 and is rotatably fixed thereon by a key 31, see Figures 4 and 7. The collars 30 are provided with grooves 32 on their periphery to receive pins 34 carried by a yoke member 35 pivotally mounted at its forward end on pin 36 carried by a bracket 37, whereby the yoke 35 is operable upon movement about the pivot pin 36 to move the collar 30 axially on the shaft 29.

A bearing block 38 is affixed to the disk 26 in registration with each of the bosses 28 and each of the blocks 38 has journalled in it a stud shaft 39, the inner end of which is provided with a gear 40 meshing with a ring gear 41. The outer ends of the stud shafts 39 are provided with disks 42 arranged in registration with the collars 30. The confronting surfaces of the collars 30 and disks 42 are provided with friction members and likewise, the confronting face of each collar 30 and the boss 28 are provided with friction members. The ring gear 41 is mounted on the stud end of a shaft 44 rotatably mounted in the quill shaft 21, the rear end of which extends beyond the rear end of the quill shaft and has affixed to it a spur gear 45.

Tension springs 47, see Figures 8 and 9, are secured at like ends to the sides of the yoke 35 and at their opposite ends to pins 48 projecting from the circular member 26. The springs 47 function to urge the yokes inwardly towards the shaft 44, the collars 30 and the disks 42 with their friction faces serving as clutches to connect the stud shafts 39 with the shafts 29.

The Geneva disk 22 is actuated by a crank member 50 having a roller 51 for movement into and out of slots 52 in the disks 22, there being four of these slots corresponding to the four shafts 29. The crank 50 is secured to a shaft 53, the forward end of which is journalled in a bearing 54 carried by the casting 15, the rear end of the shaft 53 being mounted in a bearing 56 carried by a plate 58 mounted on the rear cross member 12, see Figure 1.

The gear 45 on the shaft 44 is arranged in mesh with a gear 57 mounted on the shaft 53 and having the same number of teeth as gear 45, this gear being also in mesh with a pinion 59 on the output shaft of a gear reduction 60 operated by motor 61, also mounted on the plate 58. With this arrangement, continuous rotation is imparted to the inner shaft 44 and intermittent rotation to the quill shaft 21.

There is mounted on the outer end of each of the shafts 29 a chuck which functions to automatically center and grip pieces of dinnerware, such as plates, indicated by dotted outline at 62. These chucks consist of an actuating member 63 journalled on the outer ends of the shaft 29, as by antifriction bearings 64, see Figure 6. The actuating members 63 are of substantially circular formation and have an outwardly flaring flange 65. The bearings 64 are seated against a spur gear 66 secured to the shaft 29 as by pin 67. There are journalled in each of the members 63 a plurality of shafts 68 extending parallel to the shaft 29. There is affixed to the inner end of each of the shafts 68 a gear 70, all of the gears 70 meshing with the gear 66. There is an arm 71 secured to the outer end of each of the shafts 68 and each of the arms 71 is provided at its free end with a pin 72 extending outwardly from the chuck.

A circular ware supporting plate 73 is affixed to the actuating member 63, as by screws 74. This plate is formed with slots 75 extending radially inwardly from the periphery of the plate to receive the pins 72 when they are moved inwardly toward the axis of the shaft 29. Each of the gears 70 is provided with a pin 77 extending inwardly toward the shaft 44. A tension spring 78 is connected to the pins 77 on each pair of adjacent gears, the pins 77 being so positioned on the gears 70 that the gears are yieldingly rotated in a direction to rotate the shafts 68 and arms 71 to move the pins 72 into the slots 75 of plate 73. It will be apparent that the gear 66 serves as a sun gear, and the gears 70 as planet years. Accordingly, if the gear 66 is restrained against rotation, movement of the acuating body member 63 in a clockwise direction, Figure 5, the pins 72 will be caused to move radially outwardly from the shaft 29.

From the description thus far, it will be apparent that the members 23, 26, constitute a turret on which there are journalled four ware gripping chucks, the turret being intermittently rotated about a horizontal axis.

Figure 3:
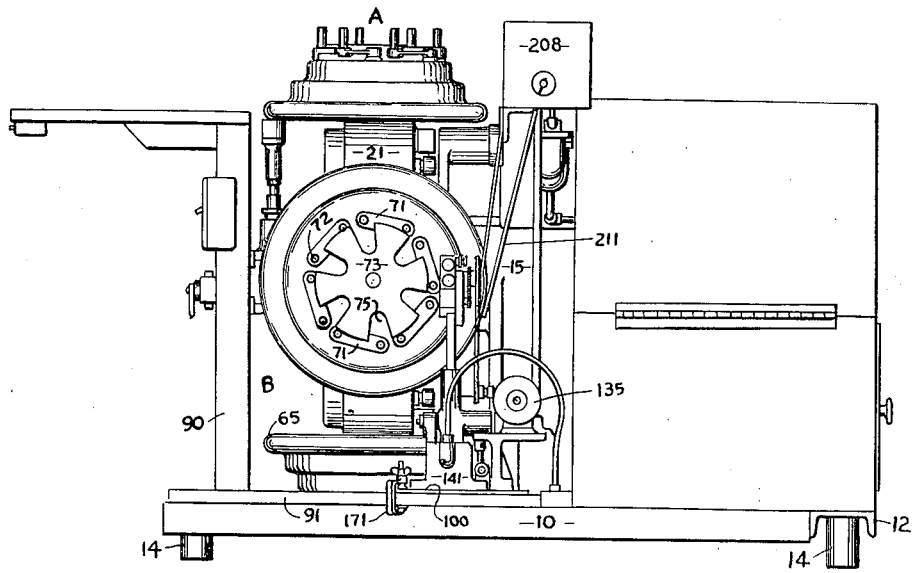
Figure 3 is an end elevational view looking to the left, Figure 1.

Referring to Figures 1, 2 and 3, the Geneva drive is so arranged that during the dwell of the indexing movement, a chuck is positioned upwardly, or at the top of the turret, as indicated at A, and with the oppositely disposed chuck positioned downwardly, the third chuck positioned horizontally at B, and the fourth chuck at C. The position A is referred to as the loading and unloading station. The positions B and C are referred to as decorating stations. The chucks are rotated continuously during their movement by the turret to and from the loading and unloading station A. However, while each chuck is positioned at station A, it is restrained against rotation.

Referring to Figures 4 and 9, there is mounted on the frame member 15, a cam block 80 which is engaged by a roller 81 carried at the inner or free end of each of the yokes 35. This end of the yoke extends through an opening 82 formed in the member 26. The engagement by the roller 81 taking place just prior to the arrival of the chuck at the loading and unloading station and continuing until a slight advancement of the chuck from that station.

The cam block 80 is pivotally mounted at one end on a pin 83, and is yieldingly urged upwardly or radially outwardly from the shaft 44 by a compression spring 84 acting against the opposite end of the cam block 80 and a fixed block 85, and upward movement of the cam block is limited by a stop pin 87, see Figure 8. The spring 84 accordingly acts to yieldingly apply the braking action on shaft 29, as hereinafter explained. Accordingly, when a chuck approaches the loading and unloading station, the collar 30 is moved upwardly out of engagement with the driving disk 42 and into engagement with the confronting surface of the boss 28. As will be apparent, this functions to disconnect the shaft 29 from the associated shaft 39 and to apply a braking action on the shaft 29 which restrains rotation of the sun gear 66.

Means, hereinafter described, is provided to engage the actuating member 63 at a point one side of the axis of the shaft 29 whereupon, during the slight forward advancement of the turret and chuck, a rotary motion is imparted to the number 63, causing the pins 72 to move radially outwardly to release a piece of decorated ware.

A piston and cylinder structure 88 is mounted on the inner surface of a plate 89 carried by uprights 90 extending upwardly from plates 91, 92, mounted on the forward portion of the side rails 10, 11, Figures 1, 2 and 4. The piston rod 93 of this unit extends vertically upwardly and is provided with a member 94, to the upper end of which there is secured a rubber block 95. The arrangement is such, upon the admission of fluid in the bottom of the unit through the conduit 96, the rubber block 95 is moved upwardly into engagement with the flange 65 of the actuating member 63, this operation taking place substantially simultaneously with the engagement of the roller 81 on the cam block 80. Accordingly, with the gear 66 restrained against rotation, continued movement of the turret with the block 95 in engagement with the flange 65, will cause a slight rotation of the member 63 sufficient to swing the arms 71 and pins 72 outwardly to the position shown in Figures 1 and 3. The piece of ware may be then removed from the chuck and a piece of undecorated ware placed on the chuck. The fluid is then exhausted through the conduit 96 and fluid is applied to the upper end of the cylinder through the conduit 98, moving the block 95 downwardly and out of engagement with the flange 65 of the chuck. This permits the spring 78 to move the pins 72 inwardly to center and grip the plate 62. The pins 72 are provided with rubber sleeves 99.

At the beginning of the succeeding indexing movement of the turret, the roller 81 passes off from the cam 80, permitting the collar 30 to engage the driving plate 42, and continuous rotation is then imparted to the chuck and the piece of ware carried thereby.

Upon the arrival of the chuck at station B, an applicator is moved into engagement with the piece of rotating ware, causing a band of colored decorating material to be applied to the ware. This band is applied by a decorating unit best shown in Figures 10 to 22, these units consisting of a base plate 100 having affixed at one end thereof a bifurcated bracket between the arms 101, 102, on which there is journalled a member 103 having a depending portion 104 and a depending pin 105. An arm 106 is attached to the member 103, as by screws 107. The arm 106 has detachably secured to its upper end an applicator head designated generally at 108. There is, or may be positioned an applicator head at stations B and C. The detail structural arrangement of the applicator head arranged at station B is shown in Figures 12 to 18, and consists of a body member 110. The lower portion of the body is provided with a tapped aperture 111 to receive a screw 112 for attaching the head to the arm 106. This lower portion is also formed with a rectangular opening 113 to receive a boss 114 extending laterally from a well 115 containing a supply of liquid decorating material. This material is applied to the ware by an applicator roll 116 detachably mounted on a shaft 117 journalled in antifriction bearings 118 positioned in a boss 119 extending from one side of the body 110. The opposite side of the body is formed with an opening of substantial dimension which is closed by a plate 120 attached to the body by screws 121. The roll 116 is positioned against a collar 122 by a nut 123 threaded on the end of the shaft 117.

The decorative material is furnished to the applicator roll 116 by a furnishing roll 125 threaded onto a shaft 126 journalled in the body. A spur gear 127 is fixed to the outer end of the shaft 126, and a spur gear 128 is affixed to the outer end of the shaft 117. These gears are both arranged in mesh with a gear 130 affixed to a pulley 131 journalled on a stud 132 projecting from the side of the body 110.

The pulley 131 is rotated by a belt 133 also trained over a pulley 134 on the output shaft of a geared head motor 135 mounted on a bracket 136 associated with the leg 102 of the bifurcated supporting casting, see Figures 10 and 11.

The arm 106 is yieldingly urged to move the applicator head 108 toward the turret by a coiled tension spring 140, one end of which is affixed to the supporting bracket and the opposite end to the depending pin 105. The arm is moved about the pivot of member 103 to move the applicator head away from the turret by a cylinder and piston structure 141 mounted on the plate 100 and having its piston rod 142 engaging the depending arm 104. The motor 135 is of the series wound, universal type and is adjusted to continuously rotate the applicator wheel 116 and the furnishing wheel 125 so that the applicator wheel has a peripheral speed slightly below that at which it is driven upon its engagement with the pieces of ware rotated by the chucks. That is, the applicator wheel 116 is rotating in the same direction and at almost the same speed as the surface of the piece of ware with which it is moved into engagement. This prevents the formation of a heavy line, or band, on the piece of ware upon initial contact of the applicator wheel, which would be the case if the applicator wheel were not rotated. With this arrangement, the piece of ware slightly increases the speed of the applicator wheel, but the wheel has no drag placed upon it by the motor 135 because with this type of motor, the motor will instantly speed up upon the lessening of the load on it so that the applicator wheel is rotated partly by the piece of ware and partly by the motor.

The applicator roll and the furnishing roll are initially dimensioned so that there is a slight space of a few thousandths of an inch between the periphery of the two rolls. This spacing serves to prevent wear on the furnishing roll when using abrasive decorating material. The amount of material furnished to the applicator roll is slightly in excess of that needed to produce the desired decorative band. A doctor blade 145 is provided to remove the excess material from the applicator roll. This blade is attached to an arm 146 pivotally mounted on the inner end of a screw 147 threaded through the side of the body and secured in adjusted position by a jam nut 148. The inner end of the screw 147 is of reduced diameter and the arm 146 is restrained against axial movement on the screw by a snap ring 150. The doctor blade 145 is formed with a slot 151 slightly wider than the width of the applicator roll, see Figure 25. That is, the doctor blade is bifurcated at one end and that end portion is mounted about the periphery of the applicator roll. The function of the screw 147 is to permit adjustment of the doctor blade parallel to the axis of the applicator roll shaft 117.

It will be apparent that the thickness of the applicator roll, or the width of its peripheral edge is complemental to the width of the decorative band applied to the surface of the ware. However, the exact width of the decorative band is determined by the width of the slot 151 in the doctor blade, this slot functioning to doctor the sides of the applicator wheel as well as the peripheral edge thereof. The blade is adjusted axially of the wheel so a uniform thickness of material is left on each side of the wheel as well as on the face thereof. This causes the band to be applied uniform in width and with its side edges clear and sharp. A change of applicator rolls necessitates a change of doctor blades and by the screw 147, the blade may be moved in proper alinement with the roll so that the peripheral edge and sides thereof may operate in the slot 151 to effect the desired result.

The doctor blade 145 is moved toward and from the applicator roll to determine the thickness of the layer of material on the roll, removing or wiping off the excess and permitting it to fall in the well 115. This adjustment of the doctor blade is accomplished by the manipulation of screws 154, 155, both of which thread through the rear wall of the body, the screw 154 engaging the arm 146 above the pivot 147, and the screw 155 engaging the arm below the pivot. It will be apparent that by the adjustment of these screws, the lower end of the arm with the doctor blade can be moved toward and from the roll 116 and secured in adjusted position.

An applicator unit may be mounted at both of the stations B and C. In order to utilize a large number of component parts in both units, it is necessary to somewhat modify the applicator head for use at station C. The structure of this head is better disclosed in Figures 19 to 22 inclusive of the drawings. In this structure, the well 160 is formed with a boss positioned in a slot 161 extending vertically upwardly from the lower end of the body and is maintained in place by a screw 162. The applicator roll 116 and the furnishing roll 125 are rotated by a belt trained over pulleys 165, 166. The pulley 166 is associated with a pulley 167 corresponding to the pulley 131 on the head for station B.

A belt 170 is trained over the pulley 167 and the pulley of the motor 135 associated with the unit. The motor drive 135, the piston and cylinder structure 141, base plate 100, and the supporting bracket, are the same for the units at both stations B and C. The base plate 100 is detachably mounted on the plates 91 or 92 by a C clamp 171. This permits the unit to be universally adjusted to effect application of the decorative band on the desired portion of the piece of ware regardless of the size of the piece of ware, or the angularity of the brim of the ware.

In the head structure for the unit at station C, the doctor blade 175, similar to the blade 145, is mounted on an arm 176 pivoted at 177. The rear end of the arm is adjusted by screws 178, 179, to effect movement of the doctor blade toward and from the periphery of the applicator roll 116, as clearly shown in Figure 20. In this head, the applicator roll is rotated clockwise, Figure 20, as shown by the arrow 180.

A table 190 is mounted upon the uprights 90, as shown in Figures 1, 4 and 2, and extends transversely across the front of the machine, and the turret is provided with a circular sheet metal cover 191 attached to the face thereof. The operator places a piece of ware on the plate 73 of the chuck positioned upwardly at station A. Closing a switch 192 connects the machine to the power supply $L^1$, $L^2$. Closing the switch 193 furnishes power to the main drive motor 61, as will be apparent in Figure 26. Closing switch 189 completes the circuit to the applicator drive motor 135 at station B through the adjustable resistor 194. Closing switch 195 completes the circuit to the applicator motor 135 at station C through the variable resistor 196.

The cylinder and piston structure 88, see Figures 1 and 4, is controlled by valve 197 actuated by a cam 198 affixed to the rear end of the shaft 44. This cam functions to actuate the valve 197 to supply fluid to the top side of the piston through conduit 199 just previous to the indexing movement of the turret. The turret is indexed to move the chuck with the piece of ware thereon to station B, the chuck, at this time, rotating a piece of ware, as previously described.

During the dwell of the turret with the chuck at station B, fluid is supplied to the inner end of the cylinder 141 through conduit 200 controlled by a solenoid actuated valve 201 when energized by a switch 202 controlled by a cam 203 mounted on the rear end of the shaft 53, see Figure 1. This causes the plunger 142 to move outwardly and to permit the arm 106 to be moved inwardly toward the turret by the spring 140, moving the applicator roll 115 into engagement with a piece of ware and effecting the application of the decorative band thereto.

Referring to the diagram, Figure 26, power is supplied to the solenoid operated valve 201 through switches 206, 202, and a switch 208. This switch 208 is mounted on the frame of the machine at the top of the frame casting 15, the switch being mounted on a plate 209 in which there is journalled a shaft 210, see Figures 23 and 24. This shaft has affixed to one end thereof a feeler rod 211 which, at the station B, extends downward. An arm is affixed to the opposite end of the shaft 210, Figures 23, 24, and extends outwardly from opposite sides of the shaft. The portion 212 of the arm carries a pin 213 engaging the actuating member 214 of the switch 208 and this portion of the arm is acted upon by a spring 215 to yieldingly urge the pin 213 against the switch actuator 214 to open the contacts of the switch. The portion 216 of the arm is operatively connected to a plunger 217 of solenoid 218 by a linkage 219.

When the solenoid 218 is energized, the portion 216 of the arm is moved to effect rotation of the shaft 210 to move the feeler rod 211 to a position where it will not be contacted by the pins 72 on the chuck during rotation or indexing of same, see position I, Figure 23. In this position of the feeler, indexing of the turret and chuck occurs. As the dwell period of the indexing of the turret and chuck approaches, solenoid 218 is de-energized permitting spring 215 to rotate shaft 210, thereby moving feeler 211 clockwise so it may detect the position of pins 72 of the chuck. If there is no ware in the chuck, pins 72 will be positioned in the bottom of the slot 75 of plate 73, see Figure 5, and feeler 211 will be rotated by spring 215 sufficiently to cause pin 213 to contact plunger 214 and open switch 208. This position of the feeler is shown in full lines in Figure 23 and is marked NW, and pins 72 are shown as 721. Opening of switch 208 prevents circuit containing solenoid 201 from being completed by cam 203 and switch 202, see Figures 1 and 26, thereby preventing fluid application to the inner end of cylinder 141, as previously described. If there is ware in the chuck, pins 72 will be displaced outwardly from the bottom of slots 75 in plate 73 a sufficient amount depending on the diameter of the ware so that they contact feeler 211 as they rotate, preventing the full clockwise movement of shaft 210 and feeler 211, thereby preventing pin 213 from opening switch 208, see Figure 23. This position of the feeler is shown dotted as position W in Figure 23. It is apparent then that solenoid air valve 201 can then be opened by cams 203 and switch 202, thereby introducing air into the inner end of cylinder 141, retracting plunger 142 and allowing spring 140 to move applicator head into contact with the ware in the chuck. This action is timed to occur at the completion of the turret indexing movement. Solenoid 218 is energized and de-energized by switch 225 actuated by cam 226 mounted on shaft 53. This cam is proportioned and adjusted to close the contacts of switch 225 at completion of the dwell period of the turret, as before described. As shown in Figure 26, solenoid 218' is also operated by cam 226 and switch 225, and functions similarly for applicator and ware detector at station C of turret. Accordingly, as the chuck arrives at station B, the solenoid 218 is energized to move the feeler rod 211 toward the axis of the chuck in order to contact the pins 72 and detect the presence, or absence, of a piece of ware in the chuck.

A detector switch 230 having a feeler rod 231 is mounted in juxtaposition to the chuck at station C and functions in the same manner as the detector switch 208 at station B. The detector switch 230 and a switch 232, controlled by a cam 233, controls the circuit to a solenoid valve 235 which, in turn, controls the flow of fluid to the cylinder 141 at station C. The switch 232, cam 233 and solenoid operated valve 235 are employed in conjunction with the detector switch 230 to provide individual ware detection for station C.

As previously stated, there may only be a band applicator unit used at station B if it is desired to decorate the ware with only one band, or the one band decoration may be applied by a decorating unit arranged at station C.

If an applicator unit is arranged at station A and one arranged at station C, the two bands of decorative material may be applied anywhere on the face of the ware and even in close proximity to each other. Also, two applicator units may be arranged at station B and two additional units at station C for the application of four bands. It will be apparent that when a plurality of applicator units are used, each may apply a different colored material.

The cams 203, 233, are proportioned to effect movement of the applicator head inwardly to apply the decorative band to the piece of ware, and then outwardly during the dwell of the turret and before the next indexing movement. As the turret is successively indexed and the chucks advanced from station C, as it approaches station A, the cam 198 will actuate the solenoid valve 197 supplying fluid to the lower end of the cylinder 88, through conduit 240, moving the block 95 into engagement with the flange 65 of the chuck, and further rotation of the turret to bring the chuck completely at station A will effect outward radial movement of the pin 72, as previously explained, whereupon the operator can remove the piece of decorated ware and position a piece of undecorated ware on the chuck.

The structural arrangement is particularly advantageous in that it is only necessary for the operator to position the piece of ware on the plate 73 of the chuck in the uppermost position at station A. From thereon, the application of the decorative band is entirely automatic, the chucks functioning to effectively grip the piece of ware varying in diameter over a large range, whereby the machine will accommodate dinnerware of various sizes from a dinner plate down to a small piece of ware.

An important advantage resides in the fact that the ware centering and gripping chucks are positioned vertically at the loading and unloading station. This permits the apparatus to be interconnected with automatic ware handling mechanism for removing the decorated ware and depositing undecorated ware on the chuck at the loading and unloading station.

What I claim is:

1. Apparatus for applying decorative bands to disklike articles of dinnerware comprising a frame, a turret journalled in the frame, a plurality of ware centering and gripping chucks carried by the turret, motion transmitting means operable to effect intermittent rotation of the turret to advance said chucks successively from a loading and unloading station to a decorating station and thence to the loading and unloading station, each of said chucks including an annular series of pins movable into and out of ware gripping position, an applicator arranged at said decorating station and operable to apply a decorative band to a piece of ware carried by a chuck positioned at said station, means operable to effect rotation of said chucks when positioned at said decorating station, means operable to restrain rotation of said chucks and to move said pins out of ware engaging position as each chuck arrives at said loading and unloading station, and means yieldingly moving said pins into ware gripping relation upon advancement of each chuck from said loading and unloading station.

2. Apparatus for applying decorative bands to disklike articles of dinnerware comprising a frame, a turret journalled in the frame, a plurality of ware centering and gripping chucks carried by the turret, motion transmitting means operable to effect intermittent rotation of the turret to advance said chucks successively from a loading and unloading station to a decorating station and thence to the loading and unloading station, motion transmitting means operable to effect rotation of said chucks while the same are positioned at said decorating station, a band applicator arranged at said decorating station and being movable toward the turret into engagement with a piece of ware carried by a chuck at said decorating station, a feeler member movable into engagement with a chuck at said decorating station, and means cooperable with said feeler upon said engagement to detect the presence or absence of a piece of ware in the chuck at said station, and being operable to restrain movement of said applicator toward the chuck in the absence of a piece of ware therein, and means operable to move said feeler outwardly from the chuck during the indexing movement of said turret.

3. Apparatus for applying decorative bands to disklike articles of dinnerware comprising a frame, a turret journalled in the frame, a plurality of ware centering and gripping chucks carried by the turret, motion transmitting means operable to effect intermittent rotation of the turret to advance said chucks successively from a loading and unloading station to a decorating station and thence to the loading and unloading station, means operable to effect rotation of said chucks while positioned at said decorating station and to restrain rotation of said chucks at said loading and unloading station, each of said chucks including an annular series of ware gripping members movable into and out of ware gripping relation, and means operable to move said gripping members out of ware gripping relation upon the arrival of each chuck at said loading and unloading station, and to effect movement of said gripping members into ware engaging relation upon the advancement of each chuck from said loading and unloading station.

4. Apparatus for applying decorative bands to disklike articles of dinnerware comprising a frame, a turret journalled in the frame for rotation about a horizontal axis, a plurality of ware centering and gripping chucks carried by the turret, each of said chucks being mounted on the turret for rotation about an axis extending radially from the axis of the turret, motion transmitting means operable to effect intermittent rotation of the turret to move said chucks successively from a loading and unloading station to an applicator station, and thence to the loading and unloading station, chuck driving means operable to effect rotation of said chucks, a disconnect means associated with each of said chucks, means located in proximity to said loading and unloading station cooperable with said disconnect means to disconnect the chucks from said chuck driving means prior to the arrival of the chucks at said station, and to connect said chucks with said chuck driving means upon advancement of chucks from said station, and an applicator arranged at said applicator station and being operable to apply a band on a piece of ware carried by a chuck positioned at said applicator station.

5. Apparatus for applying decorative bands to disklike articles of dinnerware comprising a frame, a turret journalled in the frame for rotation about a horizontal axis, a plurality of ware centering and gripping chucks carried by the turret, each of said chucks being mounted on the turret for rotation about an axis extending radially from the axis of the turret, motion transmitting means operable to effect intermittent rotation of the turret to advance said chucks successively from a loading and unloading station to an applicator station and thence to the loading and unloading station, each of said chucks having an annular series of ware gripping members movable into and out of ware gripping relation, chuck driving means oper cooperable to disconnect said chucks from said chuck driving means just prior to the arrival of the chucks at able to effect rotation of said chucks, means located in proximity to the loading and unloading station and being said loading and unloading station, and to move said gripping members out of ware gripping relation and, upon advancement of the chucks from said station to effect movement of said ware gripping members into ware gripping relation and to connect said chucks to said chuck driving means.

6. Apparatus for applying decorated bands to disklike articles of dinnerware comprising a frame, a turret journalled in the frame, a plurality of ware centering and gripping chucks journalled on the turret, motion transmitting means operable to effect intermittent rotation of the turret to advance said chucks successively from a loading and unloading station to a decorating station and thence to the loading and unloading station, means operable to effect rotation of said chucks, a decorative band applying unit arranged at said decorating station and being operable to apply a band of colored material on a piece of ware rotated by a chuck at said station, each of said chucks being provided with an annular series of ware gripping pins, means yieldingly urging said pins radially inwardly to grip a piece of ware, brake means operable to restrain rotation of each chuck at said loading and unloading station, and means cooperable upon the application of said brake to move said pins radially outwardly for the release of a piece of decorated ware.

7. Apparatus for applying decorative bands to disklike articles of dinnerware comprising a frame, a turret journalled in the frame, a plurality of ware centering and gripping chucks carried by the turret, motion transmitting means operable to intermittently rotate said turret to advance said chucks successively from a loading and unloading station to a decorating station and thence to the loading and unloading station, means operable to effect rotation of said chucks, and band applying mechanism arranged at said decorating station and operable to apply a band of color material to a piece of ware rotated by a chuck positioned at said station, each of said chucks being provided with an annular series of pins, means operable as each of said chucks approach said loading and unloading station to move said pins radially outwardly for release of a piece of dinnerware, and subsequently effect inward radial movement of said pins to grip a piece of undecorated ware prior to the advancement of said chucks from said station.

8. Apparatus for applying decorative bands to disklike articles of dinnerware comprising a frame, a turret journalled in the frame for rotation about a horizontal axis, a plurality of shafts journalled in the turret and extending radially from the axis thereof, a ware centering and holding chuck mounted on each shaft, motion transmitting means operable to intermittently rotate said turret to advance said chucks successively from a loading and unloading station to a decorating station and thence to the loading and unloading station, each of said chucks including an actuating member journalled on said shafts respectively, an annular series of ware gripping pins carried by each of said actuating members, means cooperable to yieldingly move said pins toward the axes of said shafts to grip a piece of ware by the rim, means cooperable upon relative rotation of said shafts, and actuating members to move said pins outwardly to release a piece of ware, power means operable to effect rotation of said shafts including a clutch and brake structure, cam means located in proximity to said loading and unloading station and operable just prior to the arrival of each chuck at said loading and unloading station to disengage said clutch and apply the brake to the shaft, and means operable simultaneously with the application of said brake to effect rotation of said actuating member during advancement of the chuck to said loading and unloading station.

9. A band applying unit for dinnerware decorating machines comprising a base, an arm pivotally mounted on the base, a body attached to the free end of the arm and being formed with a well adapted to contain a supply of liquid color material, a furnishing roll journalled in the body and having a portion extending into the material in said well, an applicator roll journalled in the body with its periphery in material transfer relation to the periphery of said furnishing roll, power means connected to both of said rolls and operable to effect rotation thereof in the same angular direction, a U-shaped doctor blade positioned about the peripheral edge of the applicator roll in spaced relation thereto and operable to remove surplus color material furnished to said roll by said furnishing roll, and means operable externally of the body to adjust said doctor blade toward and from the periphery of said applicator roll.

10. A lining machine for applying circular lines to the surface of circular pieces of chinaware comprising a ware supporting member operable to rotate a piece of ware about its axis, a color applicator comprising a body having a color well, a color furnishing wheel journalled in the body and having a portion extending into the well, an applicator wheel journalled in the body, means to engage and disengage the applicator wheel and the surface of the rotating ware, and power means to drive the applicator wheel at slightly less peripheral speed than the surface of the ware at a point of color application, said power means comprising a motor operatively connected to said applicator wheel and having a speed load characteristic of increasing speed as the load decreases.

11. A lining machine for applying circular lines to the surface of circular pieces of chinaware comprising a ware supporting member operable to rotate a piece of ware about its axis, a color applicator comprising a body having a color well, a color furnishing wheel journalled in the body and having a portion extending into the well, an applicator wheel journalled in the body and having its periphery in close proximity but not touching the periphery of said furnishing wheel, a U-shaped doctor blade surrounding the edge portion of said applicator wheel in spaced relation thereto and being operable to remove surplus color therefrom for deposit in the well, means to effect engagement and disengagement of the applicator wheel and the surface of the rotating ware, and power means operable to effect rotation of said wheels in the same angular direction and to drive the applicator wheel at a slightly less peripheral speed than the surface of the ware at the point of color application, said power means including a motor having a speed load characteristic of increasing its speed as the load decreases.

References Cited in the file of this patent

UNITED STATES PATENTS

| | | |
|---|---|---|
| 2,131,606 | Von Hofe | Sept. 27, 1938 |
| 2,141,630 | Westin | Dec. 27, 1938 |
| 2,203,572 | Johnson | June 4, 1940 |
| 2,380,509 | Emerson | July 31, 1945 |
| 2,558,274 | Schweitzer | June 26, 1951 |